US010900450B1

(12) United States Patent
John et al.

(10) Patent No.: US 10,900,450 B1
(45) Date of Patent: Jan. 26, 2021

(54) FUEL SYSTEM, FUEL INJECTOR NOZZLE ASSEMBLY, AND ENGINE HEAD ASSEMBLY STRUCTURED FOR DUCTED FUEL INJECTION

(71) Applicants: Caterpillar Inc., Deerfield, IL (US); Perkins Engines Company Limited, Eastfield (GB)

(72) Inventors: Bobby John, Peoria, IL (US); Robert Michael Campion, Chillicothe, IL (US); Jonathan W. Anders, Peoria, IL (US)

(73) Assignees: Caterpillar Inc., Peoria, IL (US); Perkins Engines Company Limited, Peterborough (GB)

( * ) Notice: Subject to any disclaimer, the term of this patent is extended or adjusted under 35 U.S.C. 154(b) by 2 days.

(21) Appl. No.: 16/531,826

(22) Filed: Aug. 5, 2019

(51) Int. Cl.
| | | |
|---|---|---|
| *F02M 63/00* | (2006.01) | |
| *F02M 45/08* | (2006.01) | |
| *F02M 61/10* | (2006.01) | |
| *F02B 23/06* | (2006.01) | |
| *F02M 61/18* | (2006.01) | |
| *F02D 41/40* | (2006.01) | |
| *F02M 61/20* | (2006.01) | |

(52) U.S. Cl.
CPC ....... *F02M 45/086* (2013.01); *F02B 23/0669* (2013.01); *F02M 61/10* (2013.01); *F02B 2275/14* (2013.01); *F02D 41/401* (2013.01); *F02M 61/1806* (2013.01); *F02M 61/20* (2013.01); *F02M 63/0003* (2013.01); *F02M 2200/44* (2013.01)

(58) Field of Classification Search
CPC .. F02M 45/089; F02M 61/10; F02M 61/1806; F02M 61/182; F02M 61/1846; F02M 61/20; F02B 23/0669; F02B 23/0645; F02B 23/0651; F02B 2275/14
See application file for complete search history.

(56) References Cited

U.S. PATENT DOCUMENTS

| | | | |
|---|---|---|---|
| 4,700,672 A * | 10/1987 | Baguena | F02D 19/0689 123/299 |
| 5,072,706 A | 12/1991 | Eblen et al. | |
| 7,556,017 B2 | 7/2009 | Gibson | |
| 9,453,483 B2 | 9/2016 | Kim | |
| 10,012,196 B1 * | 7/2018 | Qi | F02B 23/0651 |

(Continued)

FOREIGN PATENT DOCUMENTS

| | | |
|---|---|---|
| GB | 2003550 B | 10/1982 |
| GB | 2348247 B | 2/2003 |
| WO | 03078824 A1 | 9/2003 |

*Primary Examiner* — Thomas N Moulis
(74) *Attorney, Agent, or Firm* — Brannon Sowers & Cracraft

(57) ABSTRACT

A fuel system for an internal combustion engine includes a fuel injector having a nozzle with first and second sets of spray orifices formed therein. The fuel injector also includes a first and a second outlet check movable to open and close the first and second sets of spray orifices. Spray plume ducts are supported at fixed orientations relative to a nozzle of the fuel injector, and each are oriented in-line with a center axis defined by one of the spray orifices. The spray plume ducts may be directly attached to the fuel injector or to a duct carrier mounted to an engine head.

20 Claims, 5 Drawing Sheets

(56) References Cited

U.S. PATENT DOCUMENTS

| | | | |
|---|---|---|---|
| 2007/0023005 A1* | 2/2007 | Chmela | F02M 26/06 |
| | | | 123/305 |
| 2014/0216397 A1* | 8/2014 | Iida | F02M 61/14 |
| | | | 123/299 |
| 2015/0377197 A1* | 12/2015 | Yao | F02D 19/0694 |
| | | | 239/408 |
| 2016/0298529 A1* | 10/2016 | Anders | F02B 23/0627 |
| 2016/0298584 A1* | 10/2016 | Svensson | F02B 23/0651 |
| 2017/0089310 A1* | 3/2017 | Svensson | F02M 55/00 |
| 2017/0114763 A1* | 4/2017 | Mueller | F02P 23/04 |
| 2017/0114998 A1* | 4/2017 | Mueller | F23D 11/383 |
| 2017/0241368 A1* | 8/2017 | Anders | F02B 23/0651 |
| 2017/0356383 A1* | 12/2017 | Ito | F02B 1/12 |
| 2018/0073447 A1* | 3/2018 | Wickstone | F02D 19/0694 |
| 2018/0195430 A1* | 7/2018 | Fitzgerald | F02F 1/242 |
| 2018/0258836 A1* | 9/2018 | Anders | F02M 61/166 |
| 2019/0063391 A1* | 2/2019 | Martin | F02F 1/40 |
| 2019/0136745 A1* | 5/2019 | Kurtz | F02M 26/06 |
| 2019/0195183 A1* | 6/2019 | Hashizume | F02M 61/1853 |
| 2019/0218959 A1* | 7/2019 | Klingbeil | F02B 23/0654 |
| 2019/0277185 A1* | 9/2019 | Hashizume | F02B 3/06 |
| 2020/0011236 A1* | 1/2020 | Tanno | F02B 77/02 |
| 2020/0191045 A1* | 6/2020 | Gubba | B01F 5/0603 |

\* cited by examiner

US 10,900,450 B1

FUEL SYSTEM, FUEL INJECTOR NOZZLE ASSEMBLY, AND ENGINE HEAD ASSEMBLY STRUCTURED FOR DUCTED FUEL INJECTION

TECHNICAL FIELD

The present disclosure relates generally to ducted fuel injection in an internal combustion engine, and more particularly to ducted fuel injection using a fuel injector having dual sets of spray orifices.

BACKGROUND

Modern internal combustion engines include one or more cylinders each with an associated piston to define a combustion chamber. Fuel for combustion is delivered into the combustion chamber by, for example, directly injecting the fuel using a fuel injector. Such fuel injectors have at least one and typically several spray orifices, the opening and closing of which is controlled by way of an electrically or hydraulically actuated outlet check.

Varying fuel and air mixtures, different fuel delivery parameters equivalence ratios and other parameters can produce a range of results during combustion. Certain constituents in exhaust from an internal combustion engine are often filtered, chemically reduced, or otherwise treated to limit discharge of those constituents to the environment. In recent years there has been great interest in controlling and/or managing the manner and mechanisms of combustion in an effort to control the exhaust emissions profile of internal combustion engines. Notable amongst the emissions it is generally desirable to limit are particulate matter and oxides of nitrogen or "NOx."

Ducted fuel injection assemblies have been implemented in internal combustion engines to enhance mixing and reduce the amount of particulate matter, namely, soot, formed within the combustion chamber. Ducted assemblies typically include one or more tubular structures coupled to the cylinder head in the engine and positioned such that the ducts receive fuel spray jets from the fuel injector. The fuel spray tends to interact with the ducts to enhance mixing of the fuel with air, in particular by increasing the so-called "liftoff length" of the fuel spray jets to enable air to mix with the plumes of fuel.

One known ducted fuel injection application is set forth in U.S. Pat. No. 10,012,196B1 and entitled Duct Structure for Fuel Injector Assembly. While known ducted fuel injection techniques show promise for widespread application, there is always room for improvement and alternative strategies.

SUMMARY OF THE INVENTION

In one aspect, a fuel system includes a fuel injector having a nozzle with an outer surface, and a first set of spray orifices and a second set of spray orifices each opening at the outer surface, where each of the spray orifices in the first set of spray orifices and the second set of spray orifices defines a center axis. The fuel injector further includes a first outlet check and a second outlet check each movable between a closed position and an open position to close and open, respectively, the first set of spray orifices and the second set of spray orifices. The fuel system further includes spray plume ducts each supported at fixed orientations relative to the nozzle, and extending from a duct inlet to a duct outlet located outside of the nozzle. Each of the spray plume ducts is oriented in-line with one of the center axes defined by the first set of spray orifices.

In another aspect, a fuel injector nozzle assembly includes a nozzle having a fuel cavity formed therein, an inner surface, and a nozzle tip having an outer surface with a plurality of spray orifices formed therein. The plurality of spray orifices is arranged in a first set of spray orifices and a second set of spray orifices, and each of the spray orifices in the first set of spray orifices and the second set of spray orifices defines a center axis. The inner surface of the nozzle forms a first check seat structured for contact with a first outlet check to block the first set of spray orifices from the fuel cavity, and a second check seat structured for contact with a second outlet check to block the second set of spray orifices from the fuel cavity. The fuel injector nozzle assembly further includes spray plume ducts each supported at fixed orientations relative to the nozzle, and extending from a duct inlet to a duct outlet located outside of the nozzle, and each of the spray plume ducts being oriented in-line with one of the center axes defined by the first set of spray orifices.

In still another aspect, an engine head assembly includes an engine head having a fireside surface, a plurality of gas exchange conduits opening at the fireside surface, and an injector bore defining a longitudinal bore axis and being structured to receive a fuel injector within the engine head. The engine head assembly further includes spray plume ducts coupled to the engine head and each extending between a duct inlet and a duct outlet. The spray plume ducts are arranged in a first set of spray plume ducts structured for positioning in-line with a first set of spray orifices of a fuel injector within the injector bore, and a second set of spray plume ducts structured for positioning in-line with a second set of spray orifices of a fuel injector within the injector bore. The first set of spray plume ducts define a first set of spray plume paths that advance axially outward of the fireside surface and radially outward of the injector bore. The second set of spray plume ducts define a second set of spray plume paths that advance axially outward of the fireside surface and radially outward of the injector bore.

DETAILED DESCRIPTION

Figure 1:
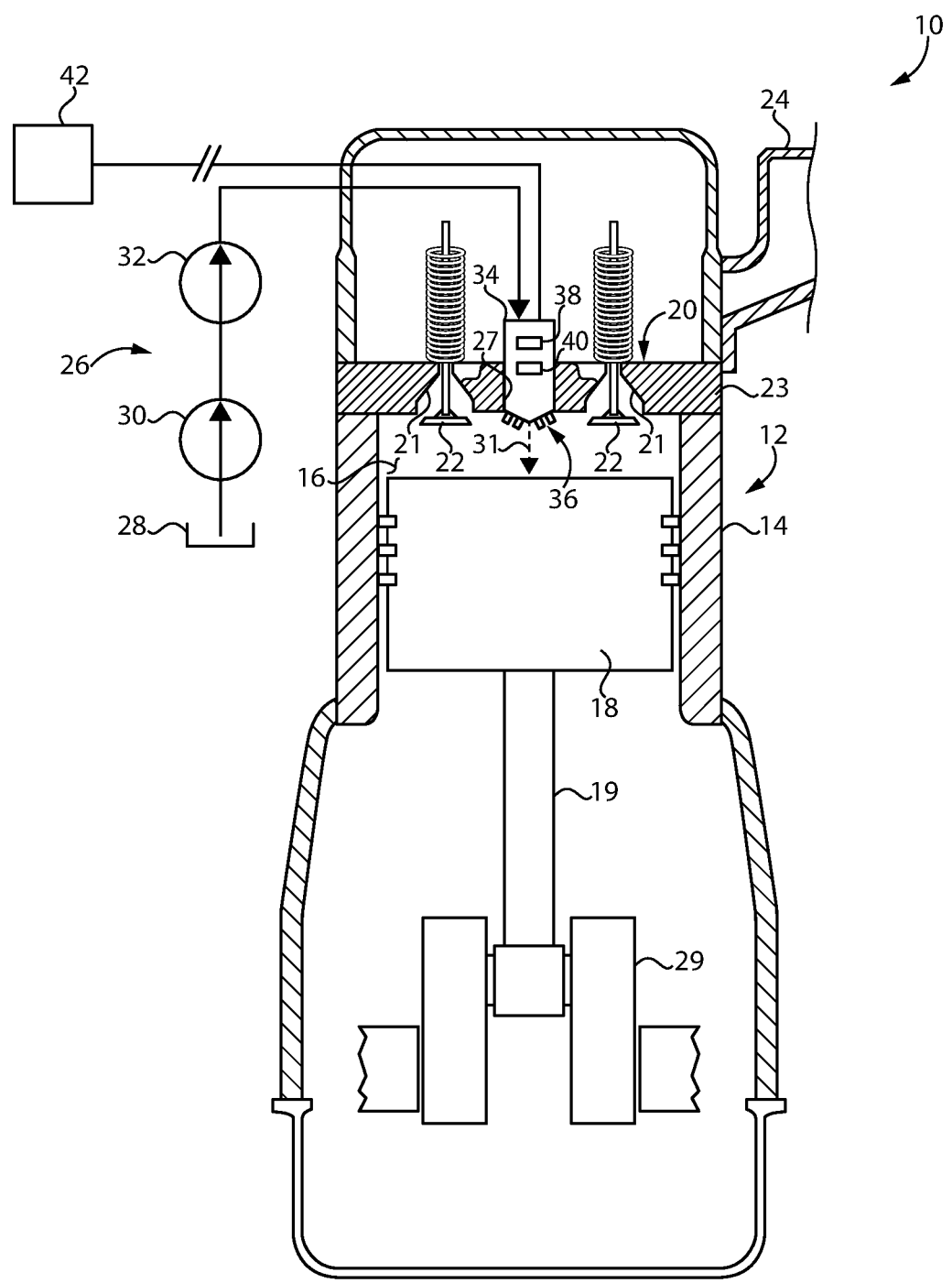
FIG. 1 is a partially sectioned side diagrammatic view of an engine system, according to one embodiment.

Referring to FIG. 1, there is shown an internal combustion engine system 10 according to one embodiment, and including an internal combustion engine 12 having an engine housing 14 with a cylinder 16 formed therein. Cylinder 16 may be one of any number of cylinders in engine 12, which can be arranged in any suitable configuration. A piston 18 is movable within cylinder 16 between a bottom dead center position and a top dead center position to rotate and be rotated by a crankshaft 29 by way of a connecting rod 19 in a generally conventional manner. Engine 12 can include a compression ignition engine structured to operate on a suitable compression ignition fuel such as a diesel distillate fuel. In certain applications, engine 12 could operate on both a liquid fuel such as diesel distillate fuel, and a gaseous fuel having a gaseous state at standard temperature and pressure such as liquefied natural gas (LNG), or potentially still another such as premixed gasoline.

An engine head assembly 20 forms part of engine housing 14, and includes an engine head 23 having a plurality of gas exchange conduits 21 formed therein. Gas exchange conduits 21 can include at least one exhaust conduit and at least one intake conduit. Gas exchange valves 22 are supported within engine head 23 and movable to selectively open or close fluid communication between cylinder 16 and gas exchange conduits 21. Also shown in FIG. 1 is a gas conduit 24 that can be an intake conduit or an exhaust conduit coupled with engine housing 14 in a generally conventional manner. In a dual fuel application, a gaseous fuel might be delivered to cylinder 16 by way of gas conduit 24, or directly injected into cylinder 16 by way of a gaseous fuel injector, for example. Engine head 23 further has an injector bore 27 formed therein defining a longitudinal bore axis 31 and being structured to receive a fuel injector within engine head 23. Engine system 10 also includes a fuel system 26 having a fuel injector 34 positioned within injector bore 27. Fuel system 26 further includes a fuel supply such as a conventional fuel tank 28, a fuel transfer pump 30, and a fuel pressurization pump 32 structured to pressurize fuel to a desired injection pressure and supply the same to fuel injector 34. Fuel system 26 could be a so-called common rail or analogous fuel system where fuel pressurization pump 32 pressurizes a reservoir of liquid fuel for delivery to any of a plurality of fuel injectors each associated with one of a plurality of cylinders in engine 12. Fuel injector 34 could also be configured as or coupled with a so-called unit pump or the like that pressurizes fuel for supplying to one or more, but less than all, fuel injectors in engine system 10. Fuel injector 34 may also include a first injection control valve assembly 38 and a second injection control valve assembly 40. Injection control valve assemblies 38 and 40 can be operated to controllably inject fuel using separate outlet checks and separate sets of spray orifices of fuel injector 34, as further discussed herein. An electronic control unit or ECU 42 is in control communication with each of injection control valve assembly 38 and injection control valve assembly 40 in a generally conventional manner. Injection control valve assemblies 38 and 40 can be separately and selectively operated for injecting fuel independently of one another, but could be used together in some instances as also further discussed herein. Fuel injector 34 further includes a nozzle 36 exposed to or positioned at least partially in cylinder 16 for injection of fuel therein. As will be further apparent from the following description, parts of fuel injector 34 and associated components are specially configured for delivery of fuel at a range of engine conditions including a range of engine load, and for other purposes.

Figure 2:
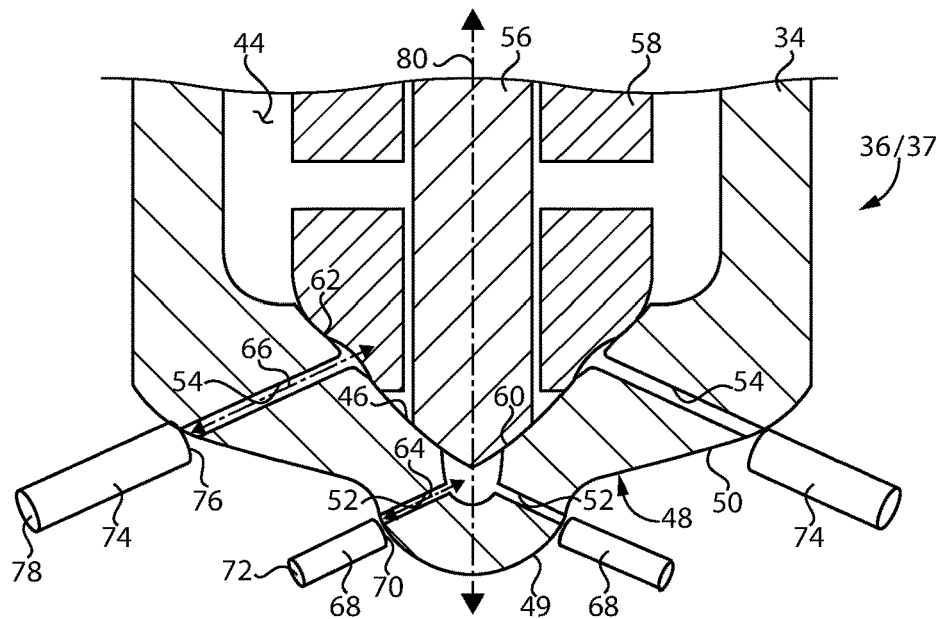
FIG. 2 is a sectioned side diagrammatic view of a nozzle assembly, according to one embodiment.

Referring also now to FIG. 2, there are shown additional details of nozzle 36, and a nozzle assembly 37 that includes nozzle 36 and other components. Nozzle 36 has a fuel cavity 44 formed therein, an inner surface 46, and a nozzle tip 48 having an outer surface 50. Nozzle tip 48 can include a bulb 49. Outer surface 50 has a plurality of spray orifices formed therein, including a first set of spray orifices 52 and a second set of spray orifices 54 each opening at outer surface 50. Each of the spray orifices in first set of spray orifices 52 defines a center axis 64, and each of the spray orifices in second set of spray orifices 54 defines a center axis 66. Fuel injector 34 also includes a first outlet check 56 and a second outlet check 58 each movable between a closed position and an open position to close and open, respectively, first set of spray orifices 52 and second set of spray orifices 54. Inner surface 46 of nozzle 36 forms a first check seat 60 structured for contact with first outlet check 56 to block first set of spray orifices 54 from fuel cavity 44 at the closed position of first outlet check 56. Inner surface 46 of nozzle 36 also includes a second check seat 62 structured for contact with second outlet check 58 to block second set of spray orifices 54 from fuel cavity 44 at the closed position of second outlet check 58.

First outlet check 56 and second outlet check 58 are coaxially arranged in fuel injector 34. Fuel injector 34 and nozzle 36 define a longitudinal axis 80, and each of first set of spray orifices 52 and second set of spray orifices 54 has a circumferential distribution about longitudinal axis 80. In certain embodiments, first set of spray orifices 52 and second set of spray orifices 54 are, relative to one another, axially offset, radially offset, or both axially offset and radially offset. In fuel injector 34, an axially outward direction means in a direction away from a geometric centerpoint of fuel injector 34, toward and then continuing outwardly of tip 48, generally parallel to longitudinal axis 80. An axially inward direction is an opposite direction to the axially outward direction. A radially inward direction means toward or closer to longitudinal axis 80, and radially outward means an opposite direction to the radially inward direction. In the illustrated embodiment, first set of spray orifices 52 and second set of spray orifices 54 are both axially offset and radially offset from one another, with second set of spray orifices 54 being axially inward of first set of spray orifices 52, and with second set of spray orifices 54 being radially outward of second set of spray orifices 54. First set of spray orifices 52 may differ from second set of spray orifices 54 in at least one of spray orifice size, spray orifice angle, or spray orifice number. Second set of spray orifices 54 may have a larger spray orifice size and a lesser spray orifice number than first set of spray orifices 52, and first set of spray orifices 52 and second set of spray orifices 54 may have substantially the same spray angle.

It should be appreciated that use of the term "first" or "second" is used for convenience only, and not intended to limit any of the description of one or the other of the sets of spray orifices or spray plume ducts, or other components, or which components has any one feature. Also in the illustrated embodiment, first set of spray orifices 52 and second set of spray orifices 54 are fluidly connected to fuel cavity 44 when the corresponding first outlet check 56 or second outlet check 58 is at the open position. In other embodiments, separate fuel cavities, or separate fuel supplies even supplying fuels of different type or fuels at different pressures, could be used. In a practical implementation strategy, fuel cavity 44 jointly supplies fuel to all of the spray orifices of fuel injector 34. Other embodiments illustrated and discussed herein can be analogously understood.

Fuel system 26 further includes spray plume ducts arranged in a first set of spray plume ducts 68 each supported at fixed orientations relative to nozzle 36, and extending from a duct inlet 70 to a duct outlet 72 located outside of nozzle 36. Each of spray plume ducts 68 is oriented in-line with one of the center axes 64 defined by first set of spray orifices 52. Fuel system 26 may also include a second set of spray plume ducts 74 supported at fixed orientations relative to nozzle 36 and each extending from a duct inlet 76 to a duct outlet 78 located outside of nozzle 36. Each of second set of spray plume ducts 74 is oriented in-line with one of the center axes 66 defined by second set of spray orifices 54. Spray plume ducts 68 and spray plume ducts 74 may be attached to nozzle 36, or otherwise supported at the fixed orientations as further discussed herein. In one implementation spray plume ducts 68 and 74 can be directly attached to outer surface 50, such as by welding, brazing, or another suitable process, or by way of a threaded engagement using threads on spray plume ducts 68 and 74 mated with threads formed in nozzle 36. Spray plume ducts 68 and 74 may be oriented in-line with center axes 64 and 66, respectively, in that spray plume ducts 68 and 74 may be coaxial with first set of spray orifices 52 and second set of spray orifices 54. The described in-line arrangement could also be understood to apply, however, where the structures are not coaxial, but center axes 64 and 66 are oriented so as to extend into the duct inlets of the respective spray plume ducts with or without intersecting the spray plume ducts themselves. Spray plume ducts 68 and 74 may differ from one another in at least one of internal diameter, spray or plume path, angle, number, or distribution, consistent with the described characteristics of the spray orifices with regard to these parameters.

Accordingly, spray plume ducts 74 may be larger in internal diameter than spray plume ducts 68, and may be longer than spray plume ducts 68, however, the present disclosure is not thereby limited and embodiments are contemplated where all of the spray plume ducts of fuel system 26 are identical and interchangeable. It should also be appreciated that spray plume ducts 68 and 74 could have constant internal diameters along the respective lengths, could have a throttled-down diameter being smaller at duct outlets 72 and 78, respectively, or outwardly enlarged and thus smaller at duct inlets 70 and 76, and larger at duct outlets 72 and 78. Spray plume ducts 68 and 74 could be arranged so as to contact outer surface 50, or could be positioned at a clearance with outer surface 50. The description herein of spray plume ducts 68 and 74 as well as the description of first set of spray orifices 52 and second set of spray orifices 54 should be understood by way of analogy to refer to any of the other embodiments discussed and contemplated herein except where otherwise indicated or apparent from the context.

Figure 3:
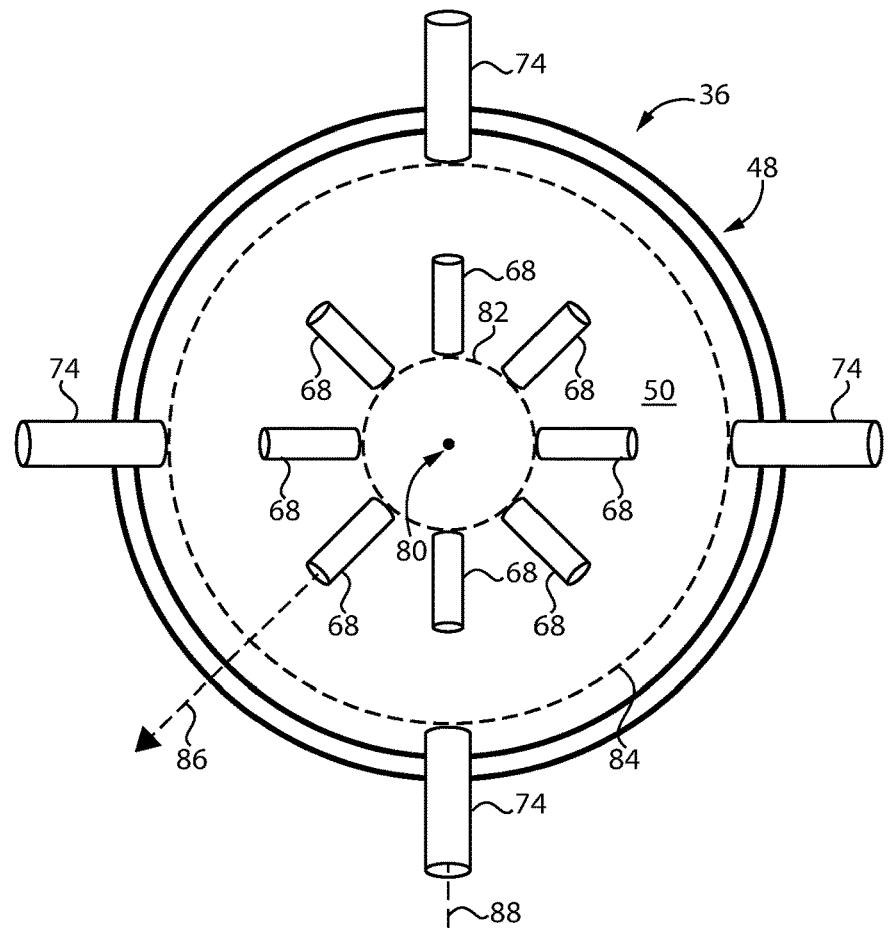
FIG. 3 is an end view of the nozzle assembly of FIG. 2.

Referring also now to FIG. 3, there is shown an end view of nozzle 36 and nozzle assembly 37 illustrating tip 48 in particular. It can be seen from FIG. 3 that spray plume ducts 68 are eight in number, and arranged radially symmetrically about longitudinal axis 80 such that duct inlets 70 are positioned substantially on a common circle 82. It can further be noted that spray plume ducts 74 are also arranged radially symmetrically about longitudinal axis 80, and positioned such that duct inlets 76 are substantially on a second common circle 84. In an axial projection plane, some of spray plume ducts 68 are circumferentially aligned with spray plume ducts 74. In other embodiments, no circumferential alignment between the respective sets of ducts might exist. Spray plume ducts 68 define spray plume paths 86 that advance radially outward of longitudinal axis 80, and axially outward of outer surface 50. Spray plume ducts 74 define spray plume paths 88 that advance radially outward and axially outward in a similar fashion.

Figure 4:
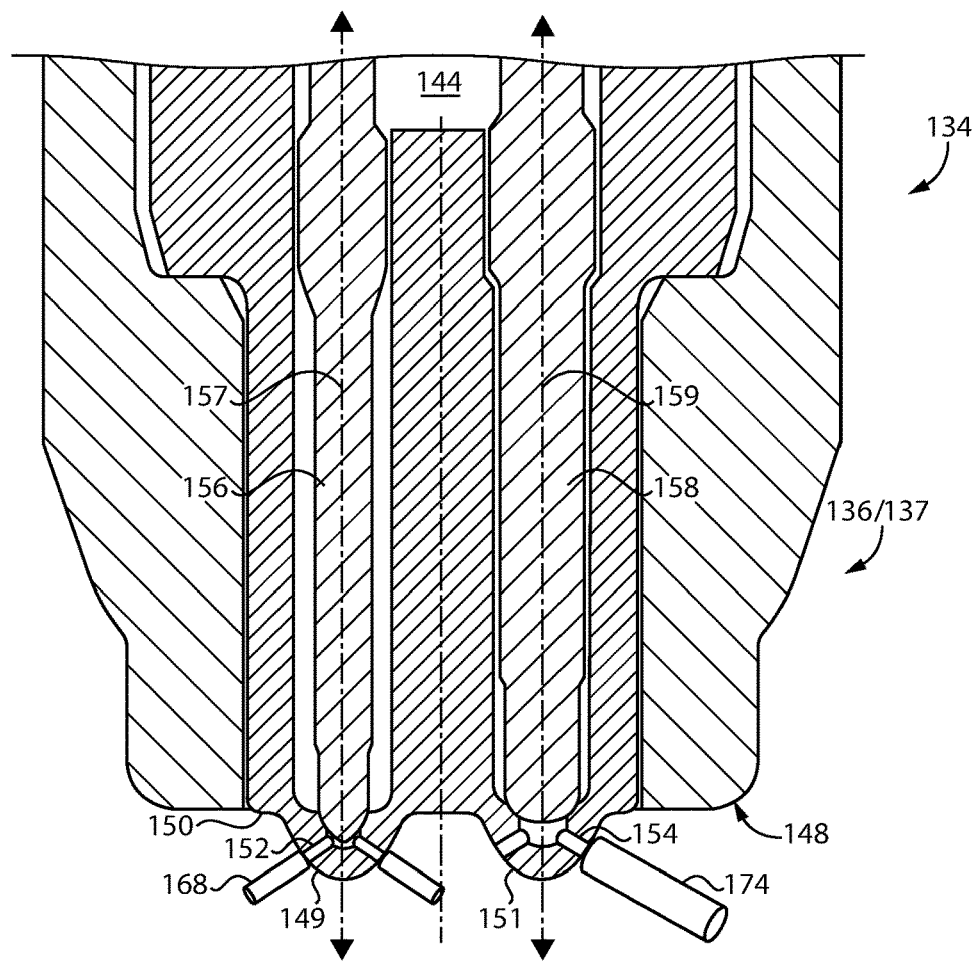
FIG. 4 is a sectioned side diagrammatic view of a nozzle assembly, according to another embodiment.
Figure 5:
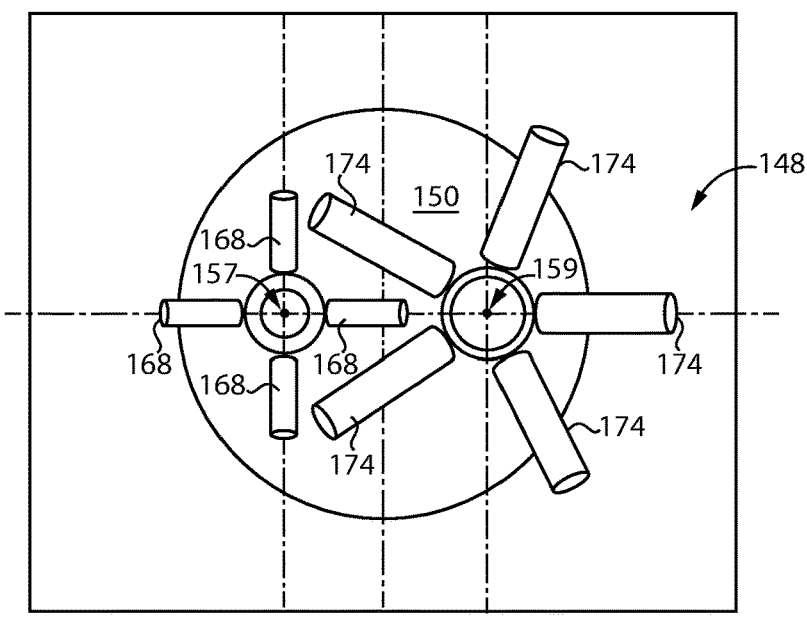
FIG. 5 is an end view of the nozzle assembly of FIG. 4.

Referring also now to FIG. 4, there is shown a fuel injector 134 according to another embodiment, and including a nozzle 136 and nozzle assembly 137. A fuel cavity 144 is formed in nozzle 136. Nozzle 136 also includes a tip 148 and an outer surface 150 that forms a first bulb 149 and a second bulb 151. A first set of spray orifices 152 open at outer surface 150, and a second set of spray orifices 154 also open at outer surface 150. Fuel injector 134 includes a first outlet check 156 defining a first axis 157, and a second outlet check 158 defining a second axis 159, and arranged side-by-side with first outlet check 156 in fuel injector 134. First and second sets of spray orifices 152 and 154 are likewise understood as arranged side-by-side. First axis 157 and second axis 159 are parallel to one another, with first set of spray orifices 152 having a circumferential distribution about first axis 157 and second set of spray orifices having a circumferential distribution about second axis 159. A first set of spray plume ducts 168 are each supported at fixed orientations relative to nozzle 136 and oriented in-line with spray orifices 152. A second set of spray plume ducts 174 are each supported at fixed orientations relative to nozzle 136 and oriented in-line with spray orifices 54. Referring also to FIG. 5, there it can be seen that first set of spray orifices 152 and thus spray plume ducts 168 are arranged in a first radially symmetric distribution about first axis 157, and second set of spray orifices 154 are arranged in a second, different radially symmetric distribution about second axis 159. It can be noted that spray orifices 152 and spray plume ducts 168 are four in number, and uniformly distributed about axis 157. Spray orifices 154 and spray plume ducts 174 are five in number and uniformly distributed about axis 159.

Figure 6:
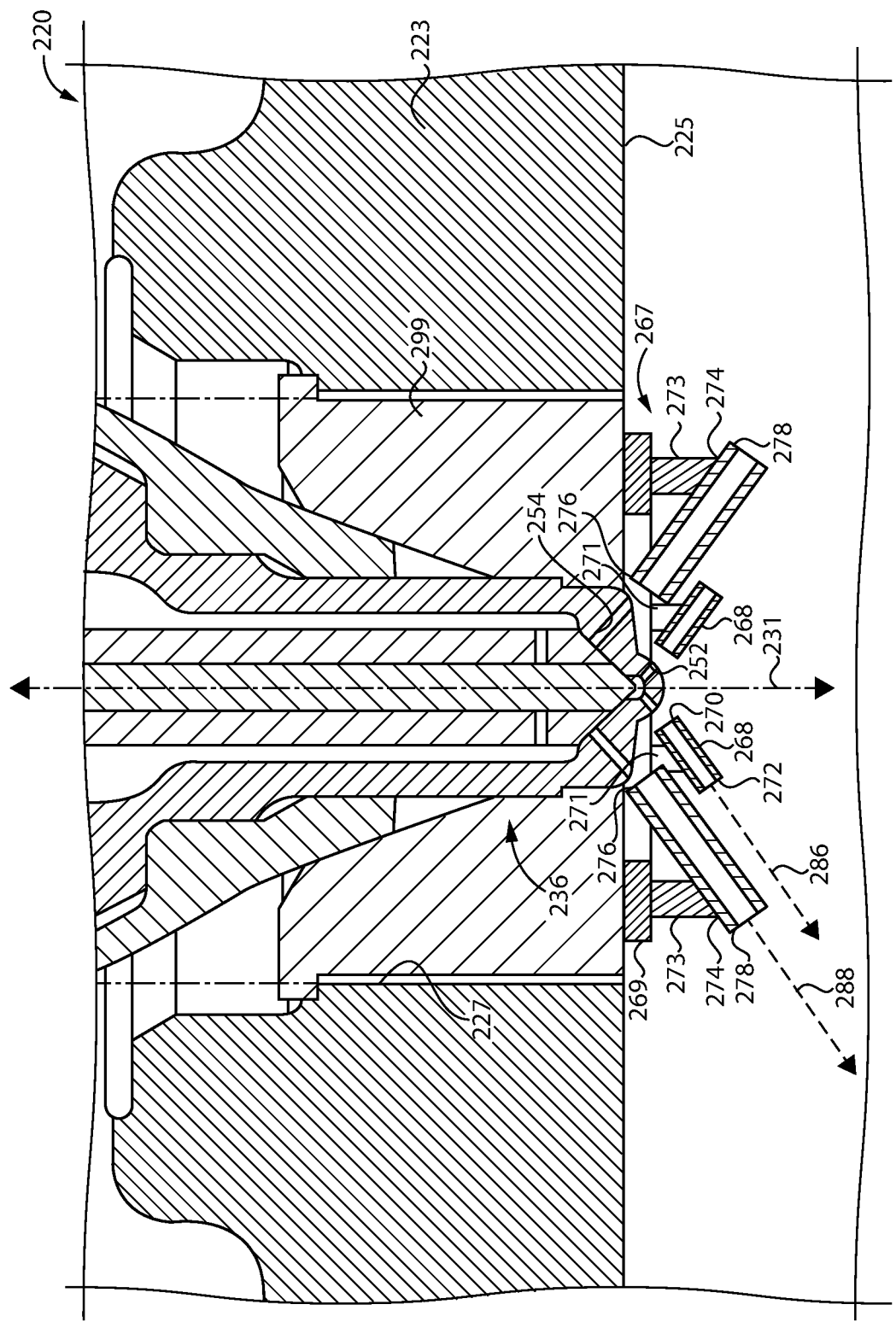
FIG. 6 is a sectioned side diagrammatic view of an engine head assembly, according to one embodiment.

It will be recalled that spray plume ducts in a fuel system and fuel injector according to the present disclosure may be directly attached to a fuel injector nozzle. In other embodiments, a separate attachment and mounting mechanism independent of the fuel injector nozzle itself may be used. Referring now to FIG. 6, there is shown an engine head assembly 220 according to one embodiment, and including an engine head 223 having a fireside surface 225, and an injector bore 227 defining a longitudinal bore axis 231 and structured to receive a fuel injector within engine head 223. In FIG. 6, a nozzle or nozzle assembly 236 of a dual concentric check injector is shown received within engine head 223. Nozzle 236 includes a first set of spray orifices 252 and a second set of spray orifices 254, and can generally be configured in a manner substantially identical to the embodiment of FIG. 2 with respect to spray orifice arrangement and other geometric attributes. Engine head 223 will also be understood to include a plurality of gas exchange conduits therein and each opening at fireside surface 225, generally analogous to the illustration in FIG. 1, but not fully visible in the FIG. 6 illustration. Engine head assembly 220 also includes spray plume ducts arranged in a first set 268 and a second set 274 and structured for positioning in-line with first set of spray orifices 252 and second set of spray orifices 254. Spray plume ducts 268 each extend from a duct inlet 270 to a duct outlet 272, and spray plume ducts 274 each extend from a duct inlet 276 to a duct outlet 278. First set of spray plume ducts 268 define a first set of spray plume paths 286 that advance axially outward of fireside surface 225 and radially outward of injector bore 227. Second set of spray plume ducts 274 define a second set of spray plume paths 288 that advance axially outward of fireside surface 225 and radially outward of injector bore 227. Also in the illustrated embodiment, spray plume ducts 268 and 274 are supported at fixed orientations by way of a duct carrier 267. Duct carrier 267 can include a base 269 that is attached to engine head 223, such as by way of attachment to an engine head insert 299 that is received within injector bore 227. Attachment of duct carrier 267 to insert 299 positioned within injector bore 227 may be by way of welding, fasteners, interference fitting, a combustion of these, or some other attachment technique. Embodiments are contemplated where duct carrier 267, or parts thereof such as base 269, is formed integrally with insert 299 or potentially integrally with engine head 223 itself. Duct carrier 267 also includes a plurality of hangers 271 extending between base 269 and spray plume ducts 268, and another plurality of hangers 273 extending between base 269 and spray plume ducts 274. The number, arrangement, and other features of spray plume ducts 268 and 274 may be substantially identical to that of spray plume ducts 68 and 74 described and illustrated in connection with fuel injector 34 above.

Figure 7:
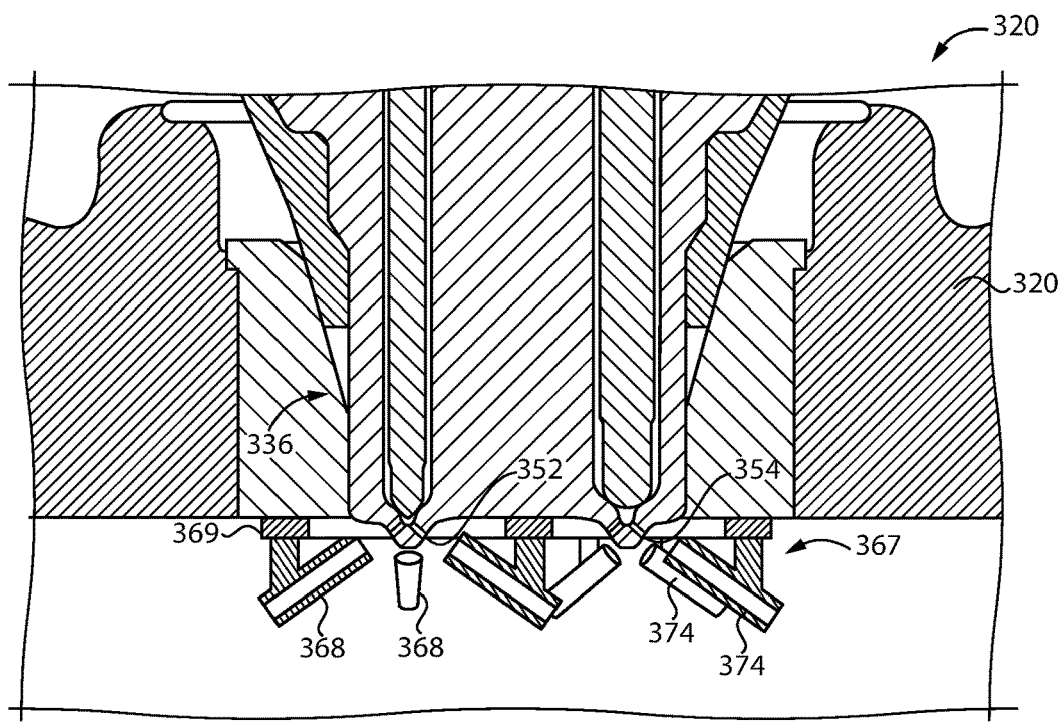
FIG. 7 is a sectioned side diagrammatic view of an engine head assembly, according to another embodiment.

Turning to FIG. 7, there is shown an engine head assembly 320 according to yet another embodiment and including an engine head 323, having a fuel injector nozzle or fuel injector nozzle assembly 336 positioned therein. Fuel injector nozzle assembly 336 can include a side-by-side dual check nozzle assembly, generally analogous to the embodiment of FIGS. 4 and 5 discussed above. Nozzle assembly 336 includes a first set of spray orifices 352 and a second set of spray orifices 354 in a side-by-side arrangement. Engine head assembly 320 also includes a duct carrier 367 having a base 369, with a first set of spray plume ducts 368 and a second set of spray plume ducts 374 attached to base 369 in a manner generally analogous to the attachment of ducts in the embodiment of FIG. 6. Base 369 might be one piece, or separate bases might be used.

Figure 8:
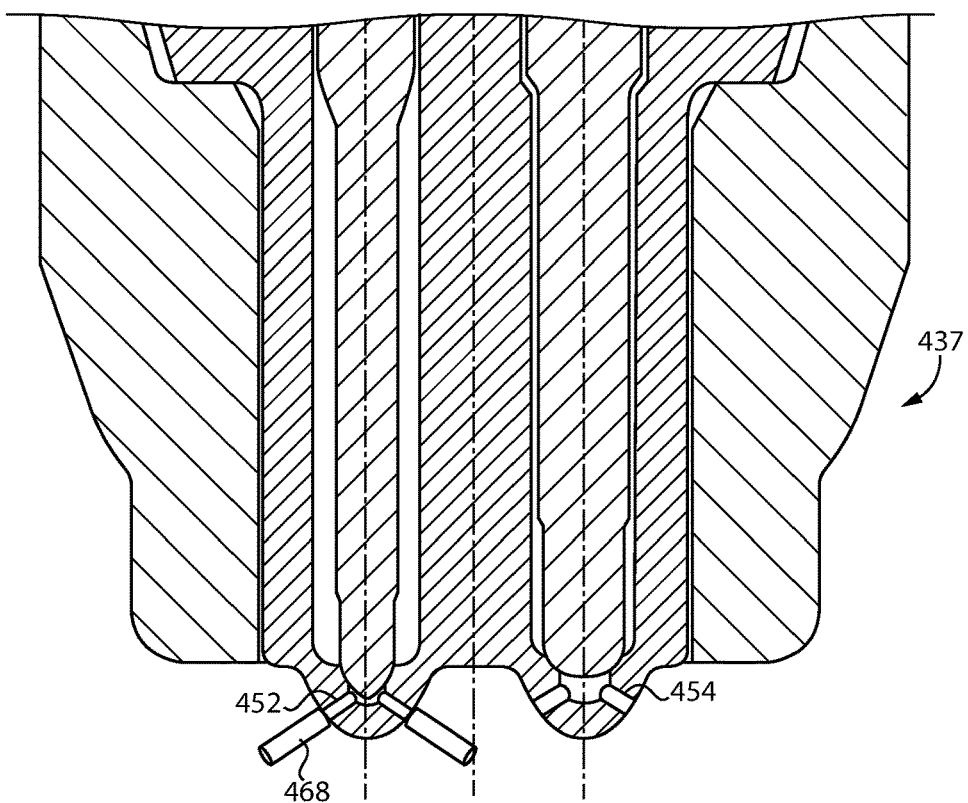
FIG. 8 is a sectioned side diagrammatic view of a nozzle assembly, according to yet another embodiment.

Turning to FIG. 8, there is shown yet another embodiment of a fuel injector nozzle assembly 436 having a first set of spray orifices 452 and a second set of spray orifices 454. In contrast to the foregoing embodiments, only a single set of spray plume ducts 468 is provided in nozzle assembly 436. Spray orifices 452 are thus understood to be ducted. Spray orifices 454 are thus understood to be non-ducted. Nozzle assembly 436 includes a dual check side-by-side arrangement. It will be appreciated that other embodiments could include a dual concentric check arrangement, with one of a first and a second set of spray orifices being ducted according to the present disclosure, and the other set of spray orifices non-ducted.

INDUSTRIAL APPLICABILITY

Referring to the drawings generally, but in exemplary reference to the embodiment of FIGS. 1-3, as suggested above there are engine operating conditions where it can be desirable to produce fuel injections having one set of characteristics, whereas in other instances the engine is best operated using fuel injections having other characteristics. For example, in some instances it is desirable to inject a relatively small amount of fuel in each engine cycle, whereas in other instances it is desirable to inject a relatively larger amount of fuel. Typically smaller fuel injection amounts are used at lower engine loads, and larger fuel injection amounts are used at higher loads. Operating engine 10 according to the present disclosure could include injecting fuel using first set of spray orifices 52 and spray plume ducts 68 by operating first outlet check 56 only when engine 10 is operated at lower loads, such as at an idle condition or in a dual fuel mode, and injecting fuel using spray orifices 54 and spray plume ducts 74 by operating second outlet check 58 only when engine 10 is operated at relatively higher engine loads. At still higher engine loads, both of first outlet check 56 and second outlet check 58 can be operated to inject a still larger amount of fuel.

In other instances, rather than selective use of the different spray orifice set to vary fuel injection amount, different characteristics of the spray orifices and/or the spray plume ducts to be used could drive the decision to use one set of orifices and ducts versus the other set of orifices and ducts, or to use both. For instance, one set of spray plume ducts might have a first spray angle, and the other set of spray plume ducts have a different spray angle, with one set used where it is desirable to inject fuel relatively early in a piston compression stroke and the other used to inject fuel relatively later in a piston compression stroke, or perhaps even as a post injection in a piston expansion stroke. In other applications, internal geometry of the spray plume ducts could be different between the sets, and exploited for various purposes. Still other variations on these general themes will be apparent to those skilled in the art. It should also be appreciated that embodiments are contemplated where one set of spray orifices in a fuel injector is ducted, and the other set of spray orifices is non-ducted, with the spray orifice characteristics otherwise being identical to one another.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel system comprising:
a fuel injector including a nozzle having an outer surface, and a first set of spray orifices and a second set of spray orifices each opening at the outer surface, and each of the spray orifices in the first set of spray orifices and the second set of spray orifices defining a center axis;
the fuel injector further including a first outlet check and a second outlet check each movable between a closed position and an open position to close and open, respectively, the first set of spray orifices and the second set of spray orifices; and
spray plume ducts each supported at fixed orientations relative to the nozzle, and extending from a duct inlet to a duct outlet located outside of the nozzle, and each of the spray plume ducts being oriented in-line with one of the center axes defined by the first set of spray orifices.

2. The fuel system of claim 1 wherein the fuel injector further includes a fuel cavity formed therein, and the first set of spray orifices and the second set of spray orifices are fluidly connected to the fuel cavity when the corresponding first outlet check or second outlet check is at the open position.

3. The fuel system of claim 1 wherein the first set of spray orifices differs from the second set of spray orifices in at least one of spray orifice size, spray orifice angle, or spray orifice number.

4. The fuel system of claim 3 wherein the spray plume ducts include a first set of spray plume ducts, and further comprising a second set of spray plume ducts supported at fixed orientations relative to the nozzle and each extending from a duct inlet to a duct outlet located outside of the nozzle, and each of the second set of spray plume ducts being oriented in-line with one of the center axes defined by the second set of spray orifices.

5. The fuel system of claim 3 wherein the second set of spray orifices are non-ducted.

6. The fuel system of claim 3 wherein the first outlet check and the second outlet check are coaxially arranged in the fuel injector.

7. The fuel system of claim 6 wherein the fuel injector defines a longitudinal axis, and wherein the first set of spray orifices and the second set of spray orifices are, relative to one another, axially offset, radially offset, or both axially offset and radially offset.

8. The fuel system of claim 7 wherein the second set of spray orifices have a larger spray orifice size and a lesser spray orifice number, than the first set of spray orifices, and wherein the second set of spray orifices are axially inward and radially outward of the first set of spray orifices.

9. The fuel system of claim 3 wherein the first outlet check and the second outlet check are arranged side-by-side in the fuel injector.

10. The fuel system of claim 9 wherein the first set of spray orifices are arranged in a first radially symmetric distribution, and the second set of spray orifices are arranged in a second, different radially symmetric distribution.

11. A fuel injector nozzle assembly comprising:
a nozzle having a fuel cavity formed therein, an inner surface, and a nozzle tip having an outer surface with a plurality of spray orifices formed therein;
the plurality of spray orifices being arranged in a first set of spray orifices and a second set of spray orifices, and each of the spray orifices in the first set of spray orifices and the second set of spray orifices defining a center axis;
the inner surface of the nozzle forming a first check seat structured for contact with a first outlet check to block the first set of spray orifices from the fuel cavity, and a second check seat structured for contact with a second outlet check to block the second set of spray orifices from the fuel cavity;
spray plume ducts each supported at fixed orientations relative to the nozzle, and extending from a duct inlet to a duct outlet located outside of the nozzle, and each of the spray plume ducts being oriented in-line with one of the center axes defined by the first set of spray orifices.

12. The nozzle assembly of claim 11 wherein the spray plume ducts are directly attached to the nozzle.

13. The nozzle assembly of claim 11 further comprising an engine head insert structured for positioning within an injector bore in an engine head, and wherein the spray plume ducts are directly attached to the engine head insert.

14. The nozzle assembly of claim 11 wherein the spray plume ducts include a first set of spray plume ducts, and further comprising a second set of spray plume ducts supported at fixed orientations relative to the nozzle and each extending from a duct inlet to a duct outlet located outside of the nozzle, and each of the second set of spray plume ducts being oriented in-line with one of the center axes defined by the second set of spray orifices.

15. The nozzle assembly of claim 14 wherein the nozzle defines a longitudinal axis, and each of the first set of spray orifices and the second set of spray orifices has a circumferential distribution about the longitudinal axis.

16. The nozzle assembly of claim 14 wherein the first set of spray orifices has a circumferential distribution about a first axis, and the second set of spray orifices has a circumferential distribution about a second axis that is parallel to the first axis.

17. The nozzle assembly of claim 11 wherein the nozzle defines a longitudinal axis, and each of the first set of spray orifices and the second set of spray orifices has a circumferential distribution about the longitudinal axis.

18. The nozzle assembly of claim 11 wherein the first set of spray orifices has a circumferential distribution about a first axis, and the second set of spray orifice has a circumferential distribution about a second axis that is parallel to the first axis.

19. An engine head assembly comprising:
an engine head including a fireside surface, a plurality of gas exchange conduits opening at the fireside surface, and an injector bore defining a longitudinal bore axis and being structured to receive a fuel injector within the engine head;
spray plume ducts coupled to the engine head and each extending between a duct inlet and a duct outlet;
the spray plume ducts being arranged in a first set of spray plume ducts structured for positioning in-line with a first set of spray orifices of a fuel injector within the injector bore, and a second set of spray plume ducts structured for positioning in-line with a second set of spray orifices of a fuel injector within the injector bore;
the first set of spray plume ducts defining a first set of spray plume paths that advance axially outward of the fireside surface and radially outward of the injector bore; and
the second set of spray plume ducts defining a second set of spray plume paths that advance axially outward of the fireside surface and radially outward of the injector bore.

20. The engine head assembly of claim 19 further comprising an engine head insert positioned within the injector bore, and wherein the spray plume ducts are directly attached to the engine head insert.

* * * * *